Oct. 17, 1933.　　　R. B. LUKER　　　1,931,231
SELF ADJUSTING ANGULAR CRANK SHAFT AND BEARING
Filed July 1, 1930
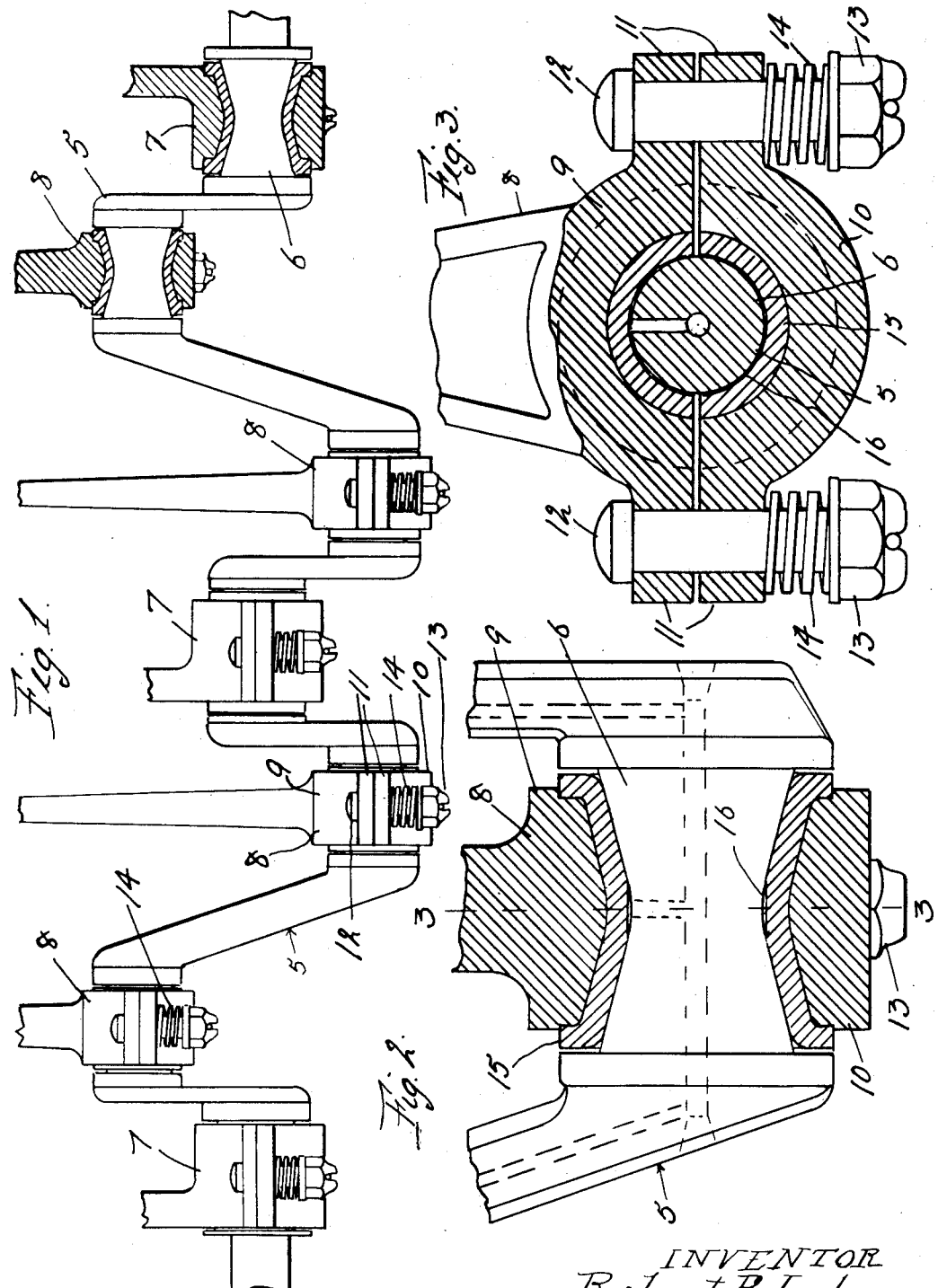
INVENTOR
Robert B. Luker
By W. W. Williamson
Atty Patented Oct. 17, 1933

1,931,231

UNITED STATES PATENT OFFICE 1,931,231

SELF-ADJUSTING ANGULAR CRANK SHAFT AND BEARING

Robert B. Luker, Gloucester, N. J.

Application July 1, 1930. Serial No. 465,087

2 Claims. (Cl. 308—23)

My invention relates to new and useful improvements in a self-adjusting angular crank shaft and bearing and relates to the main bearings as well as the crank and wrist pin bearings and the shaft. Although I will describe my invention with relation to a crank shaft in particular, it is to be understood that the same is to cover any shaft or bearing with which the invention can be used.

One of the objects of my invention is to eliminate all tendencies of end-play in the shaft.

Another object of the invention is to provide a shaft with journals tapering in opposite directions from an intermediate point, said tapers being upward and outward from the center of the journal to cause the shaft to remain in a particular position due to co-operation of the tapered journals with similarly shaped bearings having their inner surfaces tapered from a central point outwardly. By constructing a shaft in this manner, the same will not be weakened because the portion of smaller diameter can be that of the ordinary shaft when used for a similar purpose while the end portions of the journal are thicker and therefore the shaft as a whole will be strengthened.

Another object of the invention is to provide a bearing having inside tapered surfaces corresponding to the tapered journal to cause a tendency for the shaft to remain in proper endwise alignment in a bearing or bearings. Such a bearing is intended to snugly fit into the angular journal of the shaft and a film of oil can always remain between the bearing surfaces. This bearing, unlike the type having parallel surfaces, will, at all times, have less tendency to knock even though it becomes loose due to natural wear.

Knocks are often, if not always, caused by the shoulders hitting one another due to endwise movement of the shaft in the main bearings or the crank rods on the crank or wrist pins, but since the parts are aligned by the construction of the shaft and bearings set forth herein, these knocks are eliminated.

A further object of the invention is to provide for the insertion of suitable bushings between the bearing and journal, said bushings to be shaped for correspondence with the shapes of the bearing and journal.

A still further object of the invention is to provide a construction of bearing which will automatically take up any wear and thereby assist in aligning the shaft in the bearing.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawing forming a part of this application, in which:—

Fig. 1 is a side elevation of a crank shaft showing it mounted in certain main bearings and having connecting rods attached thereto, portions of the parts being broken away and two of the bearings being shown in section for convenience of illustration.

Fig. 2 is an enlarged side elevation of a portion of the crank shaft in the region of one of the wrist pins with the connecting rod bearing and bearing material shown in section.

Fig. 3 is a section on the line 3—3 of Fig. 2.

In carrying out my invention as herein embodied, 5 represents a shaft, herein illustrated as a crank shaft but which may be of any suitable or desirable construction or shape whether a crank or straight power transmission shaft and said shaft may be provided with two or more journals 6.

Each journal is tapered from the center thereof in opposite directions upwardly or outwardly toward opposite ends so that said ends are of greater cross sectional diameter than the center.

In Fig. 1, I have shown a number of main bearings 7 as well as a number of crank rod bearings 8 to illustrate their similarity. A bearing preferably consists of two similar elements 9 and 10 each provided with flanges 11 having holes for the passage of suitable fastening devices 12, such as bolts with nuts 13 screwed on to their threaded ends and preferably locked in place on the bolts. Between the heads of the bolts and the flanges of the contiguous bearing element may be springs 14 which are always under compression to some degree and therefore tend to force the two elements of a bearing together or toward each other, as will be obvious. It might be well to state at this time, because I wish it fully understood, that the device can be used without the springs or automatic take-up feature and still secure all the practical advantages of my invention.

The bearing as a whole is fashioned so that the shaft opening, or more particularly the bearing surfaces of the bearing, taper from the longitudinal center of the bearing outwardly toward the ends to correspond with the tapered journal of the shaft.

The journals and bearings being tapered as above described, if the bearings are stationary, the shaft will at once align itself, whereas if the bearings are movable, such as piston rod bearings, then said bearings will be brought into proper alignment with their journals. It is to be particularly noted that the construction herein described, not only makes the shaft stronger, without much extra material and therefore little extra weight, but the bearing surface is increased due to the larger diameters at the ends and also due to the extra length of the bearings caused by the angle of the tapers without increasing the overall length of the journal or bearing.

Another feature to which attention is particularly called is the fact that the shoulders of the bearings do not have to fit closely to the shoulders of the shaft at the ends of the journals since during the operation the tendency is for the smaller diameter of the bearing to move to the smaller diameter of the journal.

In actual practice, a bushing 15 of suitable material may be placed between the bearing and its journal and said bushing is tapered both inside and outside from the center toward the ends to correspond to the shapes of the journal and bearing and may be of two-piece or other formation, but preferably the former in order to take up any wear due to operation of the parts. As bushings are practically always used at the present time, the parts which I have termed "bearings" could be of some other shape and the outside of the bushings would be fashioned to fit such bearings but in such cases the bushings would truly be the bearings. Since the bushing is usually tapered inside and outside to correspond to a bearing and journal, said bushing will be properly aligned relative to the bearing and journal so that wear thereon will be evenly distributed.

I can foresee some conditions where one side of a journal might be higher than the other side and cause the parts to so wear that one side and possibly the angle formed by the meeting of the two tapers would be carrying the load, or such an angle might carry the entire load, therefore in some instances I produce a "flat" surface 16 between the tapers in one or both of the engaging working surfaces, such as the shaft and bearing or shaft and bushing. This arrangement will at all times permit the tapered surfaces to engage without probable interference by a ridge or angle.

From the foregoing description, it will be noted that the journals converge toward a point intermediate their lengths and likewise the bearing surfaces of the bearings also converge toward an intermediate point so that when the shaft is operating, the point of smallest diameter on a journal will remain in the smallest diameter of the opening in the bearing or vice versa due to the tapers in both the journal and the bearing, thus properly aligning the shaft and bearings relative to each other.

Of course I do not wish to be limited to the exact details of construction as herein shown, as these may be varied within the limits of the appended claims without departing from the spirit of my invention.

Having thus fully described my invention, what I claim as new and useful is:—

1. A self-adjusting bearing comprising, in combination, a shaft having journal portions each of which is tapered in opposite directions diverging from the center thereof, a split bearing having bearing surfaces similarly tapered for cooperation with the journal portions with an annular flat section between said tapered surfaces, and fastenings for said split bearing including spring means to constantly force the bearing elements toward each other.

2. A bearing of the kind described consisting of a shaft journal and a cooperating bearing member, each tapered from a point intermediate its ends to said ends with the part of smaller diameter intermediate the ends, one of said elements having a flat portion around its smaller diameter, and means to hold the bearing member about the journal.

ROBERT B. LUKER.